United States Patent

Martin et al.

(10) Patent No.: US 9,119,348 B2
(45) Date of Patent: Sep. 1, 2015

(54) TRACTOR-IMPLEMENT CONTROL SYSTEM AND METHOD

(75) Inventors: Michael J. Martin, Waterloo, IA (US);
Timothy J. Kilworth, Waverly, IA (US);
Peter Muench, Schifferstadt (DE);
Benjamin Neermann, Mannheim (DE);
Bruce C. Newendorp, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 288 days.

(21) Appl. No.: 12/748,966

(22) Filed: Mar. 29, 2010

(65) Prior Publication Data

US 2011/0238269 A1 Sep. 29, 2011

(51) Int. Cl.
| G06F 7/70 | (2006.01) |
| G06F 7/00 | (2006.01) |
| A01F 15/08 | (2006.01) |
| A01B 79/00 | (2006.01) |
| F16H 61/02 | (2006.01) |
| E02F 9/20 | (2006.01) |
| A01F 15/07 | (2006.01) |

(52) U.S. Cl.
CPC ............... *A01F 15/08* (2013.01); *A01B 79/005* (2013.01); *A01F 2015/076* (2013.01); *E02F 9/2025* (2013.01); *F16H 61/0248* (2013.01)

(58) Field of Classification Search
None
See application file for complete search history.

(56) References Cited

U.S. PATENT DOCUMENTS 7,404,355 B2 * 7/2008 Viaud et al. ............... 100/4
7,706,953 B1 * 4/2010 Sun ............................ 701/93

FOREIGN PATENT DOCUMENTS

| DE | 10219270 C1 | 4/2003 |
| DE | 10250694 B3 | 2/2004 |
| DE | 102005026159 A1 | 1/2007 |
| DE | 102005029405 A1 | 1/2007 |
| EP | 1219153 A2 | 7/2002 |

OTHER PUBLICATIONS

German Office Action, dated Feb. 11, 2014 (6 pages).

* cited by examiner

*Primary Examiner* — Ryan Zeender
*Assistant Examiner* — Denisse Ortiz Roman

(57) ABSTRACT

An implement is coupled to and pulled by a tractor. The tractor includes ground engaging drive wheels driven by an engine, an operator movable speed command device, and a tractor controller having automatic and manual speed control modes. The implement has an implement control unit coupled to the tractor controller. The implement control unit transmits an implement speed request signal to the tractor controller. The tractor controller controls tractor motion in response to operation of the speed command device and the implement speed request signal. A system and method of controlling the tractor/implement combination includes generating an Operator Speed Limit value as a function of the speed command device, comparing the Operator Speed Limit value to the implement speed request signal, and automatically exiting the automatic speed control mode and enabling the manual speed control mode if the Operator Speed Limit remains greater than the implement speed request for the duration of a predetermined time period and if the Operator Speed Limit value has been increased.

1 Claim, 3 Drawing Sheets

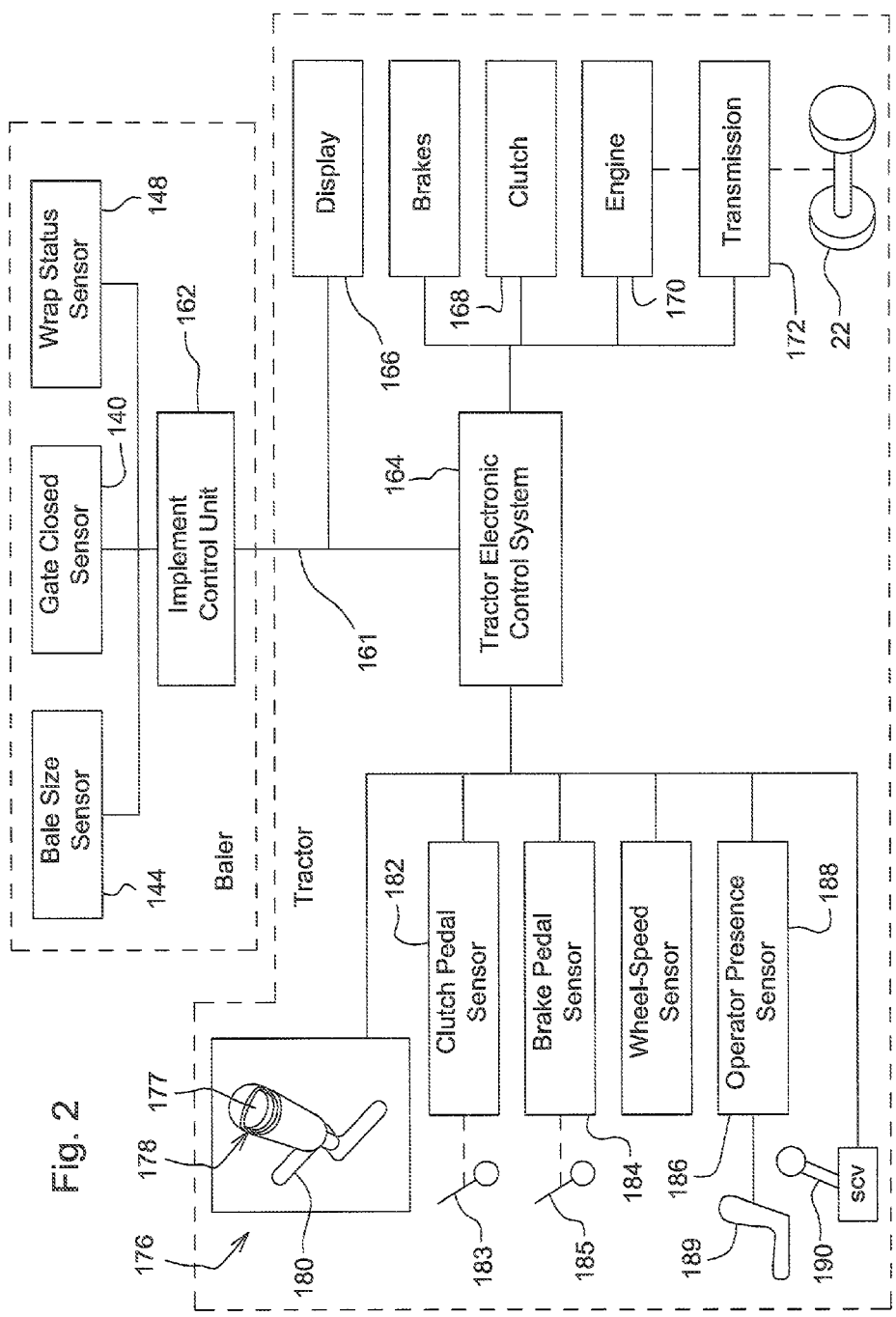

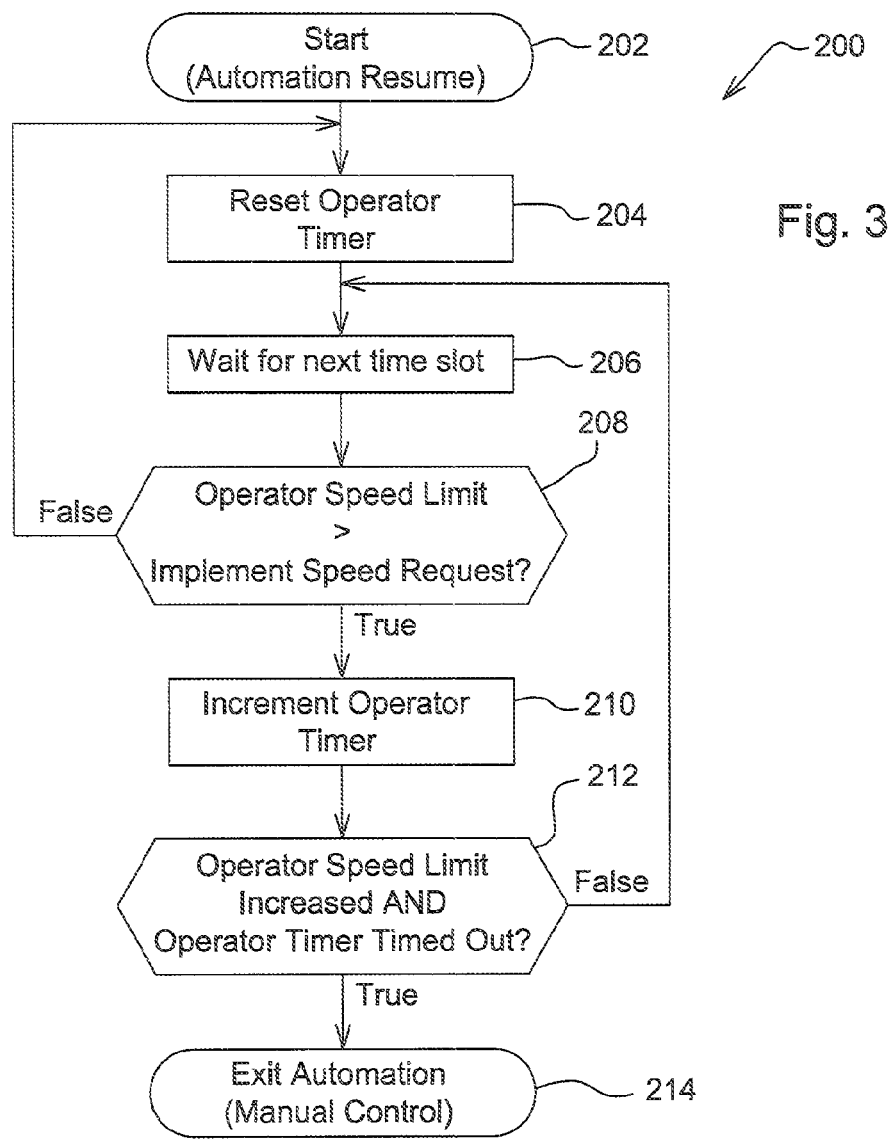

TRACTOR-IMPLEMENT CONTROL SYSTEM AND METHOD

FIELD OF THE INVENTION

The present invention relates to a system and method of controlling a tractor-implement combination.

BACKGROUND OF THE INVENTION

Agricultural tractors are used in combination with implements which are towed by the tractor. A tractor/baler combination is used in agriculture to take up crop lying or standing on a field and to press and bind it to a bale. A tractor/baler combination with automatically controlled operations is described in U.S. Pat. No. 7,404,355, issued in July 2008 and assigned to the assignee of the present application.

When a tractor is operating in the field with an external implement, such as a baler, determining and controlling the speed, it is often necessary for the operator to make temporary adjustments to the speed of the tractor. At the same time, it is not preferable to require the operator to take an explicit action to re-initiate automation after making one of these frequent adjustments. On the other hand, the operator should have the ability to take over full manual control quickly and intuitively. For example, while baling, an operator often needs to slow the vehicle down due to field conditions, such as a "rut" or a heavy windrow that the automatic speed control system cannot respond to quickly enough, and then return control to the automated system. A similar situation can occur with a tractor following a combine. But, when a combine unload operation is completed, the operator often wants to take full control of the speed as the tractor pulls away from the combine.

SUMMARY OF THE INVENTION

Accordingly, an object of this invention is to provide an improved method of controlling a tractor-implement combination.

A further object of the invention is to provide the operator with a relatively simple way to override the mistake proofing features of a tractor-implement automatic control system.

These and other objects are achieved by the present invention, wherein a system and method is provided for controlling a combination of a tractor and an implement, such as a baler, coupled to the tractor. The tractor includes ground engaging drive wheels driven by an engine which is coupled to the drive wheels by a power transmission, an operator movable command device and a tractor controller operable to control tractor motion in response to operation of the command device. The tractor controller includes selectable automatic and manual speed control modes. The baler includes a baler system for receiving crop, for baling crop into a bale and for ejecting a bale from the baler, and a baler controller coupled to the baler system and to the tractor controller. The baler controller generates an Implement Speed Request signal which is transmitted to the tractor controller and which represents a proper speed for the implement to be pulled by the tractor. According to the method, the tractor controller determines an Operator Limit Speed as a function of an operator manipulated control device, such as a speed control lever. The method also includes generating an Operator Speed Limit value as a function of the speed command device, comparing the Operator Speed Limit value to the implement speed request signal and automatically exiting the automatic speed control mode and enabling the manual speed control mode if the Operator Speed Limit is greater than the implement speed request and if the Operator Speed Limit value has been increased.

BRIEF DESCRIPTION OF THE DRAWINGS

FIG. 2 is schematic diagram of a control system for the tractor/baler combination of FIG. 1; and FIG. 3 is a logic flow diagram of an algorithm executed by the control system of FIG. 2.

DESCRIPTION OF THE PREFERRED EMBODIMENT

Figure 1:
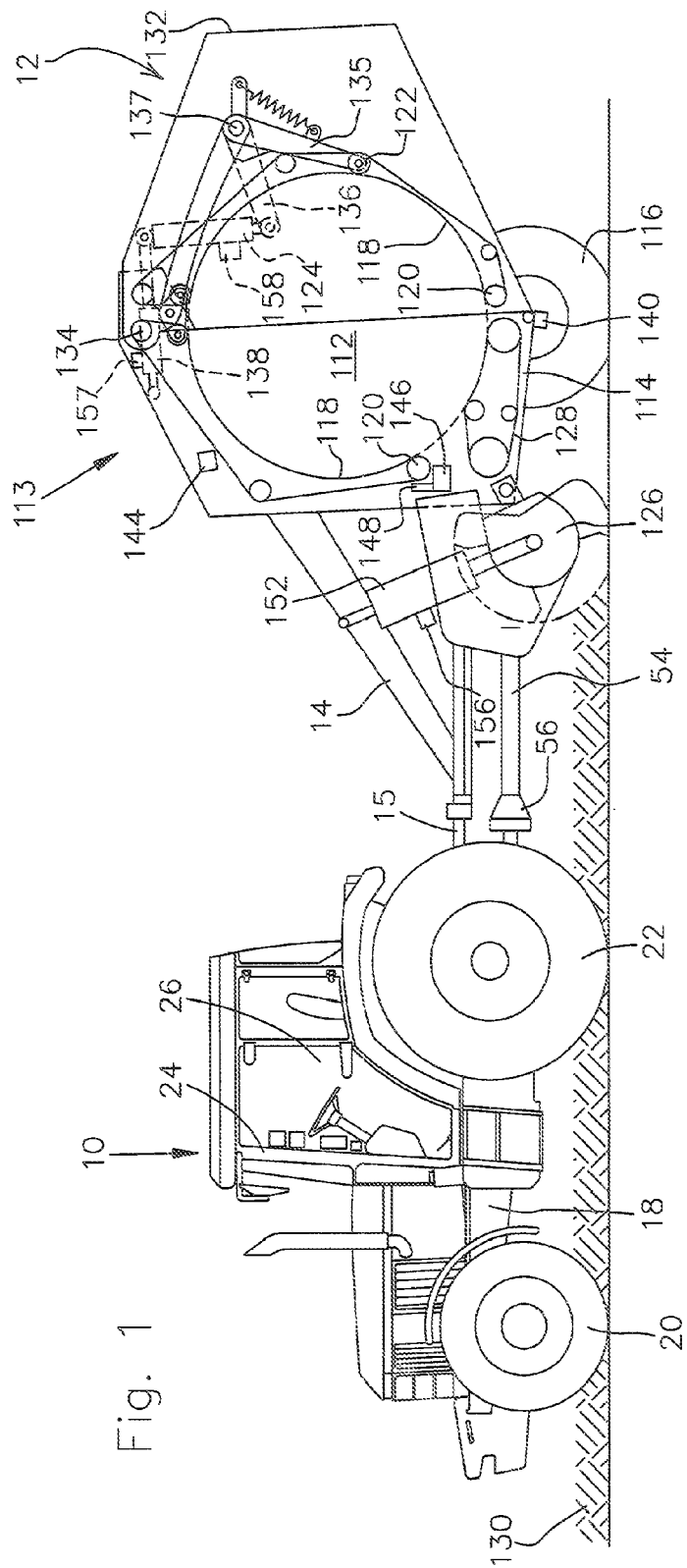
FIG. 1 is a simplified side view of a tractor with a round baler coupled thereto.

FIG. 1 shows a tractor 10 and a round baler 12 with a baler drawbar 14 coupled to a tractor drawbar 15. The tractor 10 is supported on a frame 18, which is supported on ground engaging steerable front wheels 20 and ground engaging driven rear wheels 22. The frame 18 supports a cab 24 which includes an operator's station 26. The tractor 10 includes a conventional power take-off or PTO shaft 56 which is connected to a drive shaft 54 of the baler 12.

The baler 12 includes a baler frame 114 supported on wheels 116. The frame 114 supports a baler system 11 which includes a baling chamber 112 surrounded by aprons 118 guided around rollers 120. An arm 135 supporting a roller 122 can be moved upwardly and downwardly by means of a hydraulic cylinder 124. The hydraulic cylinder 124 is connected to the arm 135 via a lever 136 that is pivotally about a horizontal axis 137. The hydraulic cylinder 124 thus determines the tension of the aprons 118. Below the front edge of the baler 12, a crop receiving pickup 126 with tines moving or rotating around a transverse axis is followed in a crop flow direction by a conveyor belt 128. The conveyor belt 128 could also be replaced by a rotor (not shown), or a rotor could be inserted in the crop flow direction between the crop receiving means and the conveyor belt 128. Instead of the pickup, any other suitable crop receiving means could be used, like mowing and conveying units. The crop receiving means 126 collects crop lying in a swath 130 of grass, hay or straw on the field and feeds it into the baling chamber 112. The aprons 118 define a baling chamber 112 of a variable size. The aprons 118 are set into motion in their longitudinal direction during a baling process, since one or more of the rollers 120 is rotatively driven. The crop introduced into the baling chamber 112 is thus also rotating during baling, while the size of the baling chamber 112 increases over time since the bale causes arm 135 to move downwardly against the force of the cylinder 124.

A rear door 132 is pivotally mounted to an upper rear location of the frame 114 at an axis 134 extending transversely to the forward direction of the tractor 10 and the baler 12. A door actuator 138 in the form of a hydraulic cylinder is mounted with one end to the frame 114 and with a second end to the rear door 132. The rear door 132 supports the rollers 120 surrounding the rear part of the baling chamber 112. Actuator 138 is connected to the rear door 132 such that it can pivot the rear door 132 upwardly (in FIG. 1 counter-clockwise) around axis 134 to be able to eject a bale from the baling chamber 112.

A rear door sensor 140 is mounted at the lower rear end of the baler frame 114 close to the lower front edge of the rear door 132. Sensor 140 senses whether the rear door 132 is closed or not by means of a switch (ot shown) actuated by the rear door 132.

Three bale size sensors 144 connected to the baler processor 110 are distributed over the width of the baling chamber 112. They sense the distance to the surface of the bale and/or of aprons 118 abutting the bale surface and provide thus information about the bale diameter at their respective location along the width of the bale. A first one of the bale size sensors 144 is assigned to a position close to the left edge of the baling chamber 112. A second one of the bale size sensors 144 is assigned to a position close to center of the baling chamber 112. A third one of the bale size sensors 144 is assigned to a position close to the right edge of the baling chamber 112.

A wrapping material dispenser 146 is located close to the baling chamber 112. It is connected to the baler controller 110 and dispenses, once instructed so by the baler controller 110, a wrapping material like twine, ribbon, net or wrapping sheet to the baling chamber 112. The rotating bale catches or pulls the wrapping material such that it is then wrapped around the bale. A wrapping material movement sensor 148 is interacting with the wrapping material dispenser 146 and senses whether the bale is pulling the wrapping.

The crop receiving means 126 can be lifted by a hydraulic cylinder 152. Sensors 156 and 158 provide information about the position of the cylinders 152, 124, respectively to the baler controller 110. Another sensor 157 senses the position of the door actuator 138 or of the gate or door 132.

Referring now to FIG. 2, the tractor baler control system 160 includes an electronic microprocessor-based baler (implement) control unit 162 which is mounted on the baler 12 and which is connected to bale size sensors 144, to gate closed sensor 140 and to wrap sensor 148. Control unit 162 is connected via a convention data bus 161, such as a CAN bus, to a tractor electronic control system 164.

The tractor electronic control system 164 preferably includes one or more conventional microprocessor-based electronic control units (not shown) which control various tractor systems and components, such as, but not limited to, the brakes 166, the clutch 168, the engine 170 and the transmission 172. The engine 170 drives the transmission 172 which drives the wheels 22. The tractor electronic control system 164 includes selectable automatic and manual speed control modes. The transmission 172 is preferably a known infinitely variable transmission or IVT. The transmission 172 could be a known power shift transmission (not shown), or any other type of commercially available transmission suitable for use in a tractor. For example, the transmission 172 can, for example, be a purely hydraulic transmission with a hydraulic pump driven the clutch 168 and a hydraulic motor or hydrostatic transmission (not shown) moving the wheels 22, wherein the transmission ratio of the gear can be changed by adjusting the swash plates (not shown) of the pump (not shown) and/or of the motor (not shown). Alternatively, the transmission could be a multistage mechanical gearbox with a torque converter (not shown) connected in series, such as used in passenger cars, or a mechanical gearbox (not shown) with a sufficient number of transmission stages and an automatically switched clutch (not shown) or planet gears (not shown) and friction clutches (not shown). Alternatively, the transmission 172 could be have step-less adjustable gearing, such as V-belts (not shown) that rotate around pulleys (not shown) with adjustable diameters, or with a mechanical and a hydraulic (or electrical) drive path, wherein a planetary transmission (not shown) comprises an element driven mechanically with a fixed or stepwise variable speed and one driven hydraulically or electrically with variable speed, and the third element (not shown) is used for output. A combination of several of the mentioned transmissions would also be conceivable.

An interface/display unit 174 is connected to the control system 164 through the CAN bus 161. The control system 164 receives speed command signals from a known speed control or command device 176 which has a speed command or drive lever 178 movable in a gate or slot 180. The lever 178 includes a speed wheel 177 for fine tuning the speed command signal and for setting a limit speed. The control system 164 may also receive signals from a clutch pedal sensor 182 coupled to clutch pedal 183, a brake pedal sensor 184 coupled to brake pedal 185, a wheel speed sensor 186, an operator presence sensor 188 coupled to seat 189, and a selective control valve (SCV) unit 190. The SCV unit 190 can be manipulated by the operator to control functions on the baler, such as the rear door or gate 132.

The baler controller 162 generates an Implement Speed Request signal which is transmitted to the tractor controller 164. The Implement Speed Request signal represents a speed at which the baler 12 should be pulled in order for the baler 12 to function in a desired or optimal manner. The tractor electronic control system 164 periodically generates an Operator Speed Limit value. The tractor electronic control system 164 generates the Operator Speed Limit value by multiplying a speed value set by the wheel 177 times a lever position value which ranges between 0 and 100% and which is determined by the position of the lever 178 in the slot 180. When in its automatic speed control mode, the control system 164 will attempt to drive the tractor 10 at a speed which is the minimum of an operator limit set by wheel 177 and the speed requested by the implement controller 162 via the Implement Speed Request signal.

Referring now to the flow chart of FIG. 3, when the tractor electronic control system 164 is operating in its selectable automatic speed control mode, the tractor controller system 164 periodically executes an algorithm 200. The conversion of the above flow chart into a standard language for implementing the algorithm described by the flow chart in a digital computer or microprocessor, will be evident to one with ordinary skill in the art.

The algorithm begins at step 202 when the tractor control system is its automatic speed control mode.

Step 204 resets an operator timer so as to determine a time period, such as 2 seconds.

Step 206 causes the algorithm to wait for a time period sufficient so that the next step will be executed at a desired repetition rate, such as every 10 miliseconds.

Step 208 compares the Operator Speed Limit value to the Implement Speed Request. If the Operator Speed Limit value is not greater than the Implement Speed Request, then step 208 directs the algorithm back to step 204. If the Operator Speed Limit value is greater than the Implement Speed Request, then step 208 directs the algorithm to step 210.

Step 210 increments the Operator timer, and directs the algorithm to step 212. In step 212, if the Operator Speed Limit has been increased and the Operator timer has timed out, then step 212 directs control to step 214, else back to step 206.

Step 214 ends the subroutine 200 and causes the controller 164 to exit from automatic speed control and enables manual speed control.

As a result, the algorithm 200 operates to perform the following method. The tractor electronic control system 164 operates to exit from its automatic speed control mode and enable the manual speed control mode if the Operator Speed Limit remains greater than the Implement Seed Request for the duration of the Operator Timer time period and if the Operator Speed Limit has been increased.

The invention is the way the operator's interactions with the speed command lever 178 are handled while in the automatic speed control mode. Specifically, the operator can pull back on the lever 178 to temporarily decrease speed and then move it forward again to allow the implement system to control the speed. When a condition occurs so that the operator wants or needs to increase speed beyond the speed requested by the implement system, a simple movement of the lever 178 forward will exit automation and return full control of the speed to the operator. Changes of the wheel 177 by the operator have a similar effect on the actual speed command as well as automation mode.

In other words, when the operator decreases the tractor speed by pulling back on the lever 178 (or rotating the wheel 177), a subsequent speed increase will not necessarily cause an exit from the automatic speed control mode. If the actual speed is based on the implement request (i.e. the speed set by the command lever 178 is set above the speed requested by the implement), any increase in the speed commanded by the lever 178 or the wheel 177 will cause an exit from the automatic speed control mode. The behavior to remain in automation or to exit automation maintains the behavior that pulling the lever back decreases speed and moving it forward increases speed without exiting automation unless necessary to match this behavior.

This system allows the operator to use the speed command lever 178 and wheel 177 in the same intuitive way that it is adjusted during "normal"/non-automated operations. The response of the tractor behaves the same from the perspective of the operator (pulling back decreases speed, pushing forward increases speed), but does not exit automation mode unnecessarily.

While the present invention has been described in conjunction with a specific embodiment, it is understood that many alternatives, modifications and variations will be apparent to those skilled in the art in light of the foregoing description. For example, the invention would be applicable to a tractor-implement combination where the implement is an implement other than a baler, such as a planter or a sprayer. The invention would also be applicable to a tractor in combination with any type of auxiliary control unit, such as a GPS unit or a guidance system, which can be connected to the tractor control system and which can cause the tractor control system to stop the tractor under certain conditions. Accordingly, this invention is intended to embrace all such alternatives, modifications and variations which fall within the spirit and scope of the appended claims.

We claim:

1. A method of controlling a combination of a tractor and an implement coupled to the tractor, the tractor including ground engaging drive wheels driven by an engine, an operator movable speed command device and a tractor controller operable to control tractor motion in response to operation of the speed command device, the tractor controller having automatic and manual speed control modes, the tractor controller generating an Operator Speed Limit value as a function of the speed command device, the implement having an implement control unit coupled to the tractor controller and the implement control unit transmitting an implement speed request signal to the tractor controller, the method comprising:

in step 1, resetting an operator timer;

next, in step 2, wait for the next time slot;

next, in step 3, compare the Operator Speed Limit value to the implement speed request signal, and if the Operator Speed Limit is not greater than the implement speed request then returning to step 1, and if the Operator Speed Limit is greater than the implement speed request then proceeding to a step 4; and in step 4, incrementing the operator timer; and in step 5, if the Operator Speed Limit value has been increased and the operator timer has timed out then proceeding to step 6, else returning to step 2; and in step 6, exiting the automatic speed control mode and enabling the manual speed control mode.

* * * * *